United States Patent [19]

Becker

[11] Patent Number: 4,751,006
[45] Date of Patent: Jun. 14, 1988

[54] COOLANT RECLAMATION UNIT

[75] Inventor: Roger T. Becker, Kalamazoo, Mich.

[73] Assignee: Monlan, Incorporated, Kalamazoo, Mich.

[21] Appl. No.: 74,257

[22] Filed: Jul. 16, 1987

[51] Int. Cl.⁴ ............................................. B01D 33/04
[52] U.S. Cl. .................................... 210/774; 210/783; 210/175; 210/387; 210/400; 210/526
[58] Field of Search ............... 210/783, 784, 805, 806, 210/160, 241, 387, 400, 401, 526, 774, 175

[56] References Cited

U.S. PATENT DOCUMENTS 4,110,218 8/1978 Marriott et al. ..................... 210/223
4,421,647 12/1983 Estabrook et al. .................. 210/401
4,673,502 6/1987 Fox ...................................... 210/413

Primary Examiner—Frank Sever
Attorney, Agent, or Firm—Flynn, Thiel, Boutell & Tanis

[57] ABSTRACT

A unit for cleaning and reclaiming contaminated coolant, including a unitary tank structure having a first storage compartment for contaminated coolant and a second storage compartment for clean coolant. A drag-type conveyor extends along the bottom of the first compartment for removing coarse contaminants in the form of a sludge. A pump supplies partially cleaned coolant from the first compartment to a filter unit disposed above the second compartment. The filter unit employs a movable conveyor belt having a filter paper extending over the belt for movement therewith. The coolant from the first tank is discharged onto the filter paper so that contaminants collect thereon and move with the filter paper for external discharge. The cleaned coolant flows downwardly through the filter paper and collect in the second compartment. A further pump permits the cleaned coolant in the second compartment to be withdrawn and resupplied to the filter unit so that the coolant in the second compartment can be recycled back through the filter paper to improve the filtering efficiency.

12 Claims, 3 Drawing Sheets

COOLANT RECLAMATION UNIT

FIELD OF THE INVENTION

This invention relates to an improved coolant reclamation unit which is self-contained and permits multiple stage filtering of contaminated coolant so as to permit effective separation of both coarse and fine contaminants.

BACKGROUND OF THE INVENTION

The coolant used in association with machine tools is relatively costly, and an attempt is made to reuse same. However, during use, the coolant becomes highly contaminated with not only coarse contaminants such as machine chips and the like, but also fine contaminants which are difficult to remove. The coolant also becomes contaminated due to its contact with typical oils such as hydraulic fluids as used in association with machines, such oils being referred to as tramp oil, and becomes rancid.

At the present time, effective cleaning and reusing of coolant is limited by the ability to effectively remove the contaminants, particularly the fines, from the used coolant. While various techniques and apparatus have been utilized in an attempt to clean the coolant so as to permit reuse, nevertheless such techniques and apparatus have provided only limited results.

For example, one commonly used apparatus employs a separator wherein the contaminated coolant is deposited in a tank having a cleated drag conveyor movable along the bottom thereof, which conveyor collects thereon the coarse contaminants and removes them from the coolant. Such arrangement also often employs a skimmer for removing the tramp oil from the surface of the coolant. This known apparatus, however, is wholly unsuitable for removing the fines, and hence the coolant is only partially cleaned. Often the coolant is then supplied to a hydrocyclone, also such device does not effectively remove the fines.

Another known cleaning apparatus employs a paper bed filter positioned over a carrier chain, whereupon the contaminated coolant is deposited onto the filter and the contaminants create a filter cake thereon, whereupon the coolant filters downwardly by gravity into a collecting chamber. With such arrangement, the carrier chain and the paper filter are periodically advanced in an intermittent manner to sequentially move a clean filter under the inlet since the filter cake, after reaching a certain size, prevents any effective flow of coolant therethrough. While such arrangement is effective for removing fines, nevertheless such arrangement provides a very small flow rate therethrough, and the apparatus does not provide multiple filtering stages or steps so as to optimize both the rate and efficiency of the coolant cleaning operation.

Still another known technique or apparatus, and in fact the apparatus which has previously proven most effective in cleaning the coolant of fines so as to permit reclaiming and reuse of the coolant, employs a centrifuge as the critical element for effecting separation. In this known apparatus, the dirty coolant is supplied by a pump to a heater, and from there the dirty coolant is supplied to a centrifuge which, in a conventional manner, effects separation of the particles from the coolant, with the latter then being supplied to a coolant-receiving tank so as to be reused. Such apparatus, however, particularly due to the presence of the centrifuge, creates undesirable structural and functional complexities, particularly with respect to maintenance.

In view of the difficulty in satisfactorily cleaning the coolant to a sufficient degree to permit reclaiming and reusing, many manufacturing operations either do not reuse the coolant or are able to reuse only a small percentage thereof, and the remainder is disposed of. This is obviously undesirable since not only is the coolant expensive, but the disposal of the coolant creates a significant waste disposal problem. While extremely large manufacturers have provided systems which are able to clean the coolant with sufficient efficiency to permit its reuse, such manufacturers do so only by providing systems which normally provide multiple apparatus and hence often subject the coolant to numerous cleaning steps, with the coolant requiring significant handling and transporting between the various cleaning steps. Such systems themselves are bulky and space consuming, and are costly to install and operate. As such, such systems are wholly unsuitable for smaller manufacturers who produce smaller quantities of such contaminated coolant and who can not afford to invest in such large systems.

Accordingly, the present invention relates to an improved coolant reclamation unit which is believed to overcome many of the aforementioned disadvantages, and which is particularly desirable for use either by small manufacturers or for mounting on a truck or the like to enable it to be transported about so as to provide a reclaiming service for small manufacturers. This invention is particularly desirable for operation on the batch principle, that is, for cleaning a predetermined volume of contaminated coolant.

More specifically, the improved coolant reclamation unit of the present invention is a unitized self-contained unit which, in association with a single tank structure, performs an initial cleaning so as to effect removal of the coarse contaminants such as metal chips, with the coolant from the first cleaning tank then being supplied through a heater to a second cleaning tank having a filtering conveyor associated with the inlet thereof, which filtering conveyor has a paper filter associated therewith. The fluid from the first tank is supplied to the paper filter conveyor which is effective for removing fines, with the coolant flowing therethrough into the second tank. The coolant in the second tank is resupplied back to the paper filter unit at a location upstream from the supply from the first tank to more effectively remove the fines. The complete unit can be readily mounted on a truck and transported about so as to be usable at any selected job site.

Other objects and purposes of the present invention will be apparent to persons familiar with structures of this general type upon reading the following specification and inspecting the accompanying drawings.

BRIEF DESCRIPTION OF THE DRAWINGS

FIG. 4 illustrates a variation.

Figure 1:
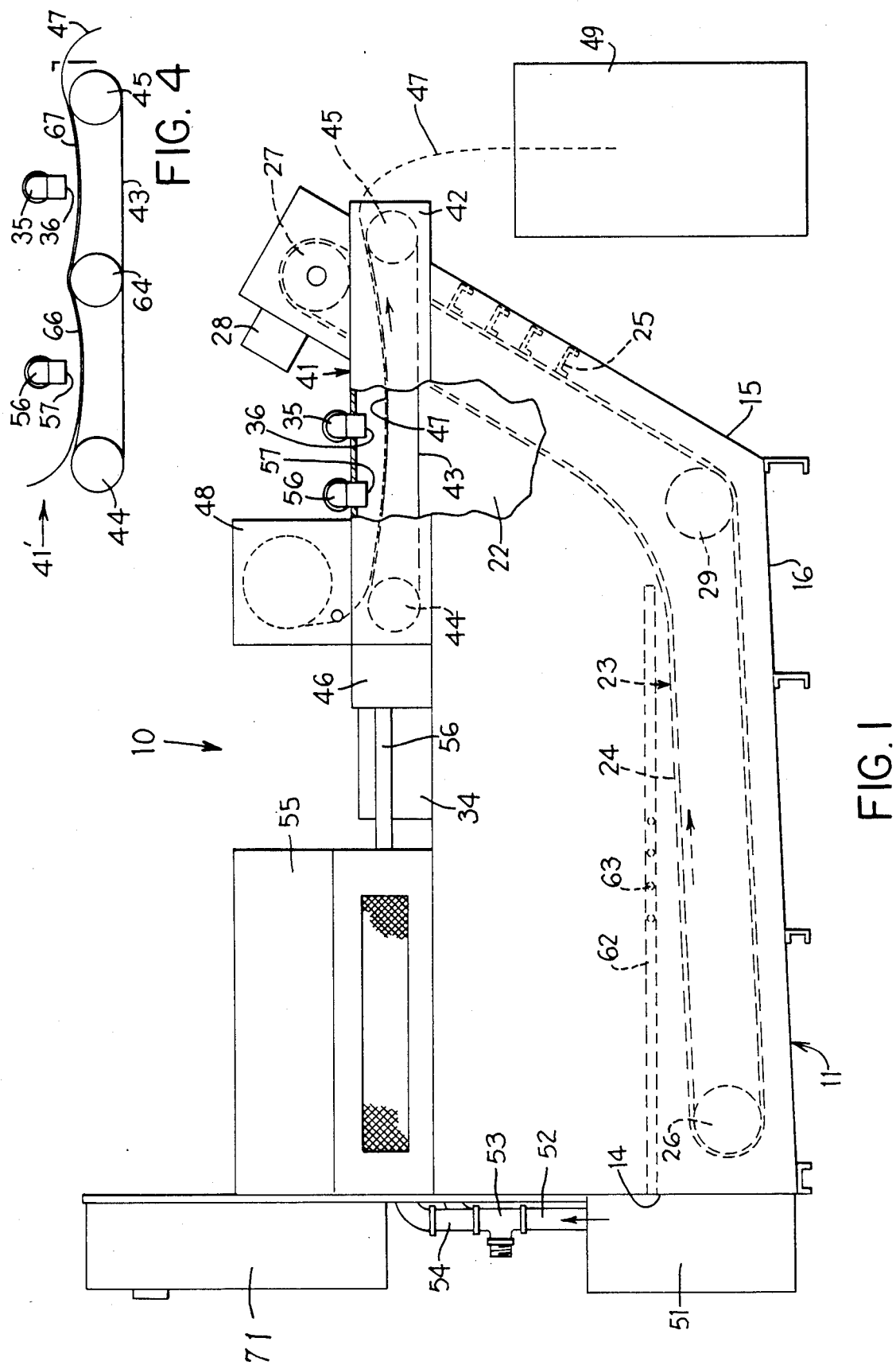
FIG. 1 is a side elevational view of the reclamation unit according to the present invention.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the unit and designated parts thereof. Said terminology will include the words specifically mentioned, derivatives thereof, and words of similar import.

DETAILED DESCRIPTION

Referring to the drawings, there is illustrated a coolant reclamation unit 10 according to the present invention. This unit 10 includes a tank structure 11 having opposed generally parallel side walls 12 and 13, end walls 14 and 15, a bottom wall 16 and a top wall 17. The tank structure also includes an intermediate partition or dividing wall 18 which extends between the end walls in generally parallel relationship between the side walls. The presence of the partition 18 divides the tank structure into two separate and isolated storage compartments, namely a first storage compartment 21 as defined between the side wall 12 and partition 18 for receiving therein the dirty coolant, and a second compartment 22 as defined between the partition 18 and side wall 13 for receiving therein the clean coolant. The top wall 17 has an opening 19 associated therewith and communicating solely with the compartment 21 for permitting a batch of dirty coolant to be deposited therein.

The first compartment 21, in which is contained the dirty coolant, has means associated therewith for effecting removal of the coarse contaminants such as metal chips and the like. This latter-mentioned means, in the illustrated embodiment, comprises a conventional flight-type drag conveyor 23 which is effective for collecting the solids which settle by gravity to the bottom of the compartment 21, and thence removing these settled solids and sludge for external discharge. This drag conveyor 21 comprises a pair of sidewardly spaced endless conveyor chains 24 having a plurality of flights or drag bars 25 extending transversely therebetween. The conveyor chains 24 extend around a first end sprocket 26 located adjacent the bottom of the compartment 21 at one end thereof, and around a further end sprocket 27 adjacent the other end of the compartment but spaced upwardly above the level of the liquid therein, this latter sprocket normally being driven in a conventional manner from a drive unit 28. A further intermediate sprocket 29 is normally provided adjacent the bottom wall somewhat downwardly from the drive sprocket 27 so that the conveyor chains and the drag bars thereon, particularly as associated with the lower chain reach, move downwardly at an incline along the inclined end wall 15 and thence scrape along the bottom wall 16 toward the end sprocket 26 so as to pick up the sludge and coarse or heavy contaminants which settle on the bottom of the compartment 21. The sludge picked up by the drag bars is then carried upwardly by the upper reach to the drive sprocket 27 and, in passing therearound, the sludge is externally discharged, such as into a suitable receptacle 31. This drag conveyor 23 is effective for removing the heavy or coarse contaminants, and thus results in the dirty coolant deposited in the compartment 21 being in a partial or semicleaned condition.

The use of a drag-type conveyor for effecting semicleaning of a coolant, specifically for removing sludge and heavy contaminants, is conventional and is disclosed in greater detail in U.S. Pat. Nos. 3,585,133 and 3,385,448. Further, other conventional conveyors could be used for removing the heavy contaminants, such as a rotatable screw conveyor disposed in a trough at the bottom of the compartment.

In the unit 10 of the present invention, the semicleaned coolant is withdrawn from the compartment 21 by a conventional pump 32 which has the housing thereof attached to and hence carried by the end wall 14 of the tank. This pump 32 has the inlet (not shown) thereof in communication with the compartment 21. The outlet from pump 32 connects to a conduit 33 which supplies the semicleaned coolant to a conventional heater 34, such as a cal-rod type heater. The semicleaned coolant in flowing through the heater 34 is heated to a temperature which is preferably in the range of about 140° F. to about 160° F. so as to destroy the bacteria in the coolant. The coolant exiting the heater 34 then passes into a further conduit or pipe 35 which terminates in a discharge 36, the latter being located directly above and in communication with the other compartment 22 for permitting transference of coolant thereto.

The compartment 22 has a filtering apparatus 41 associated therewith for effecting removal of fine contaminants (hereinafter referred to as "fines") from the semicleaned coolant as supplied from the first compartment 21. This filtering apparatus 41 is disposed directly above the upper boundary of the compartment 22 and, in fact, is located directly above the top wall 17, but disposed directly below the discharge 36 of the supply conduit 35.

The filtering apparatus 41 includes a boxlike housing 42 which is mounted on and projects upwardly from the top wall 17 of the tank structure, although the bottom wall of this housing 42 along with the underlying part of the top wall 17 is removed so that the interior of the housing 42 hence opens directly downwardly into the compartment 22, as illustrated in FIG. 1.

The filtering apparatus includes a continuous or endless media carrier chain 43 which is of high porosity so as to readily permit coolant to pass therethrough. This chain 43 extends between a pair of rotatable sprockets 44 and 45 which are located within but adjacent the opposite ends of the housing 42, with one of the sprockets being driven in a conventional manner from a motor 46.

Filter apparatus 41 also includes a disposable filtering media in the form of a continuous elongate paper strip 47 which is supplied from a supply roll 48 so that the paper filter media 47 is supplied downwardly and hence overlies the upper reach of the belt chain 43 and moves longitudinally therewith toward the end sprocket 45, at which point the paper filter strip 47 is fed outwardly of the housing 42 and deposited into a suitable receptacle 49. The spool 48 is also driven from the motor 46 so that the paper filter media 47 always moved with the belt 43, the latter normally being moved in an intermittent manner. The belt 43 and filter paper 47 extend across the complete width of the housing 42.

The upper reach of belt 44, as it extends between the end sprockets 44 and 45, preferably contains enough slack so that the upper belt reach contains a slight pocket or depression for receiving the semicleaned coolant discharged from the supply conduit 35, with the discharge 36 of this conduit preferably being located about midway between the sprockets 44 and 45.

The filter apparatus 41 functions to receive the semiclean coolant from the conduit 35 into the pocket defined by the upper reach of belt 43. The presence of the filter paper 47, which is preferably of extremely small micron size such as permitting filtering in the range of 10 to 20 micron size, causes even the fine contaminants to be trapped by and hence collected on the paper filter media 47, while at the same time relatively clean coolant passes through the paper 47 and the chain 43 so as to be deposited collected within the compartment 22. The movement of the filtering conveyor 41 causes the filtering paper 47, and the contaminants trapped thereon, to move outwardly through the end of the housing 42 so as to be deposited into the external collecting receptacle 49.

With respect to the relatively clean coolant which is deposited into the compartment 22, it is subjected to additional cleaning due to the recycling of the coolant from the compartment 22 back through the filtering apparatus 41. To effect this recycling, there is provided a second pump 51 which is mounted on the end wall 14 directly adjacent the first-mentioned pump 32. This pump 51 has the inlet (not shown) thereof in communication with the compartment 22 so as to permit withdrawal of the coolant therefrom. Pump 51 has the outlet thereof in communication with an outlet conduit 52, the latter having a conventional three-way valve 53 associated therewith. This valve 53 when in a "recycle" position enables the conduit 52 to communicate with a further conduit 54 which connects to a conventional cooling unit 55 which is mounted on the top wall 17 of the tank structure directly above the compartment 22. This cooling unit preferably comprises a finned-type heat exchanger having forced air passing externally thereover to effect cooling of the coolant as it passes through the cooling unit. The coolant, after leaving the cooling unit, then passes into a further conduit 56 which resupplies the coolant to the filtering apparatus 41 to effect further filtering thereof to more effectively remove the fines. The conduit 56 terminates in a discharge 57 which is disposed directly over the paper filter media 47. This discharge 57, relative to the direction of movement of the filter media 47, is preferably located upstream a substantial distance from the discharge 36. Hence, the already relatively clean coolant as supplied through the discharge 57 directly contacts the clean paper filter media 47 so that a substantial amount of this already cleaned coolant will rapidly pass through the filter media downwardly into the compartment 22, and the clean filter media 47 is able to effectively filter and remove additional fines from the coolant which passes into the compartment 22. At the same time, the semi-clean coolant supplied from the discharge 36 contacts the filter media 47 downstream from the discharge 57 and hence both of the discharges 36 and 57 can be simultaneously operating and at the same time the filtering apparatus 41 will permit efficient filtering of contaminants from the coolant.

With this arrangement, after the entire batch of semi-clean coolant from the compartment 21 has all been supplied to the compartment 22, then continual recycling of the coolant in the compartment 22 can occur back through the filtering apparatus 41 so as to improve the cleanliness of the coolant, without any cross contamination occurring in the filtering apparatus 41.

When removal of the clean coolant from the compartment 22 is desired, then the valve 53 is shifted so as to connect the conduit 52 with a discharge conduit 58, whereupon the pump 51 will then discharge the cleaned coolant for external use as desired.

The unit 10 has a conventional tramp oil skimmer 61 mounted thereon, such as on the top wall 17, for communication with the dirty coolant contained in the compartment 21 so as to effect skimming of the tramp oil therefrom. Such skimmer 61 is conventional.

Figure 2:
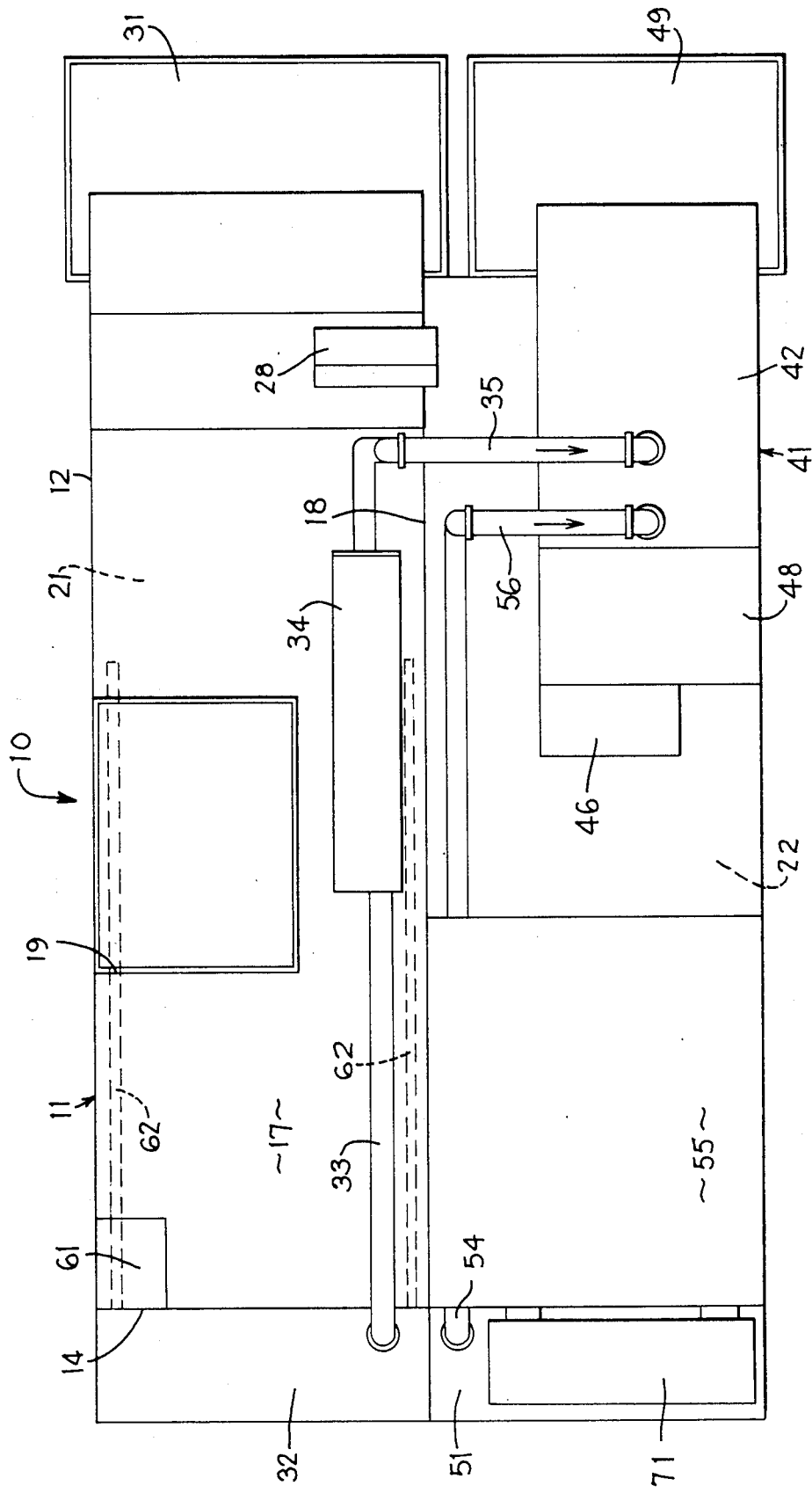
FIG. 2 is a top view of the unit shown in FIG. 1.
Figure 3:
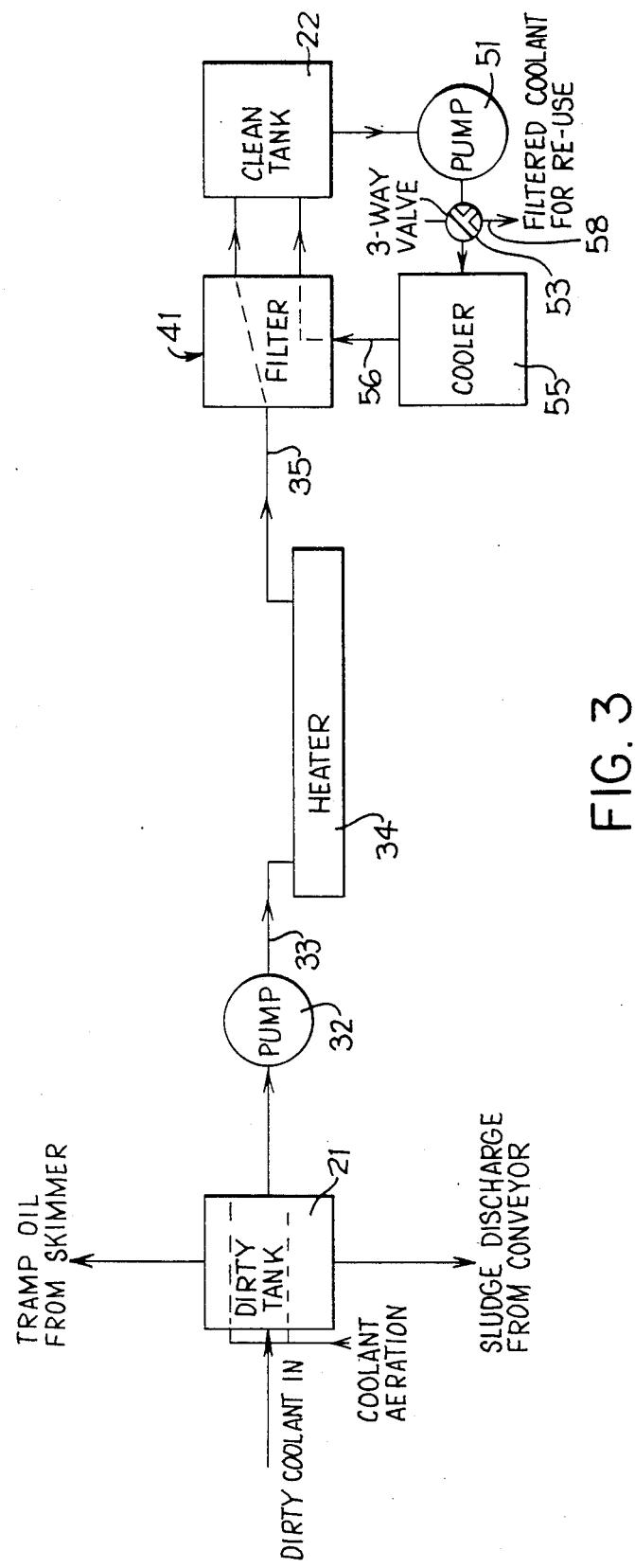
FIG. 3 is a flow diagram which illustrates the operation of the reclamation unit.

To significantly improve the removal of the heavy contaminants from the dirty coolant in the first storage compartment 21, this compartment preferably has a coolant agitating means associated therewith. This coolant agitating means, in the preferred embodiment, comprises an elongate conduit 62 which extends through the coolant within the compartment 21 and has a plurality of small orifices 63 extending through the wall thereof at spaced intervals along the conduit. This conduit 62 extends externally of the compartment 21 and connects to a source of pressurized air, such as a compressor (not shown). In this manner, pressurized air supplied to the conduit 62 flows outwardly through a large number of orifices spaced longitudinally throughout the length of the tank. These air jets which are created by the orifices 63 greatly increase the agitation of the coolant within the compartment 21, thereby accelerating the rate at which the heavy contaminants settle to the bottom of the tank, and additionally accelerating the rate at which the tramp oil rises to the surface so as to be skimmed off by the skimmer 61. The invention preferably employs two such conduits 62 disposed adjacent the opposite sides of the compartment 21 substantially as illustrated by dotted lines in FIG. 2, with these conduits 62 preferably being positioned adjacent the lower part of the tank but at an elevation slightly above the upper reach of the drag conveyor. This air agitation of the dirty coolant is particularly effective for a batch-type operation, in accordance with use of the apparatus of the present invention.

The unit 10 also has a control panel 71 mounted thereon, such as on an upward extension from the end wall 14, so as to permit suitable control over the unit, including control of the drive motors and pumps. Such controls are conventional, and hence are not described in detail.

The coolant reclamation 10 of the present invention is a wholly self-contained unit since the tank structure 11 defines therein both of the coolant compartments 21 and 22 and additionally mounts thereon the drag conveyor arrangement 23 and the filtering apparatus 41, and also desirably mounts thereon all related accessories such as the pumps, the heating unit, the cooler, the control panel and the like. Some of these accessories, such as the pumps, could obviously be mounted separately if desired. Hence, the unit 10 permits the complete cleaning operation to be carried out on a batch of dirty coolant without requiring multiple and complex systems. The unit 10 can also be readily transported about, such as by being mounted on a truck or the like, so as to be moved from one manufacturing location to another to permit cleaning of coolants as collected at such locations, whereupon this service can be performed for various manufacturers without the manufacturer having to invest in suitable equipment. This unit 10 also permits efficient cleaning and hence reusing of a large percentage of the dirty coolant, and minimizes the amount of dirty coolant and contaminants subject to disposal. The receptacles 31 and 49 are portable and separable from the unit 10, and this increases the convenience of use since such receptacles must be readily movable to permit emptying thereof and/or disposal of the contents therein. At the same time, this enables the unit 10 to be installed into a manufacturing operation and enables the unit to be coupled to any type of receptacle or disposal arrangement for receiving the waste.

The operation of the unit 10 is believed apparent from the description set forth above so that further detailed description is believed unnecessary.

Referring now to FIG. 4, there is illustrated a variation of the filtering apparatus 41' which can be used in conjunction with the unit 10 of this invention. In this variation, the conveyor belt 43 again extends between the rotatable drive pulleys 44 and 45 but the upper reach of the belt also passes over an intermediate support or deflector, such as an intermediate support pulley 64 in the illustrated embodiment. This intermediate support pulley 64 can also preferably be driven synchronously with the end pulleys 44 and 45. This intermediate support pulley 64 causes the upper reach of the belt 43 to have an upstream portion 66 which extends from end pulley 44 to intermediate pulley 64, and a downstream portion 67 which extends from the intermediate pulley 64 to the end pulley 45. This upstream upper belt reach section 66 contains enough slack so that it defines a slight pocket or depression, and the discharge 56 is positioned directly thereover, so that only the clean coolant which is recycled from the compartment 22 is deposited into this pocket, which pocket has the clean filter media 47 supplied thereto. Similarly, the downstream upper belt reach section 67 as it extends between the pulleys 64 and 45 also has a slight pocket or depression, and the discharge 35 is disposed thereabove so that this downstream depression hence receives therein only the dirtier coolant as supplied from the compartment 21. In this manner, the two filtering depressions defined by the sections 66 and 67 individually communicate only with the discharge outlets 57 and 36, and hence the recycled cleaner coolant is exposed only to the clean filter media, which media then subsequently passes to the depression region 67 and is exposed to the dirtier coolant, whereby more effective filtering of the coolant occurs and more efficient utilization of the filter media is accomplished. Other than this change in the filter apparatus 41', the rest of the unit 10 otherwise structurally and functionally cooperates as described above. This filtering arrangement 41' of FIG. 4 is particularly desirable in that it permits mor efficient filtering if coolant is being supplied through both of the discharges 57 and 36 at the same time.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A self-contained unit for cleaning a batch of contaminated coolant, comprising:

tank means having a unitary wall structure defining first and second interior compartments which are disposed in generally side-by-side relationship but are isolated from one another, said wall structure having opening means associated therewith for permitting a batch of dirty coolant to be deposited into said first compartment;

contaminant removing means associated with said first compartment for effecting removal of heavy contaminants and sludge which collect in the bottom of said first compartment, said contaminant removal means including conveyor means positioned within and movable relative to said first compartment adjacent the bottom thereof for picking up the heavy contaminants and moving them outwardly of said first compartment for discharge at an external location;

filtering means associated with an inlet to said second compartment for removing the fine contaminants from the coolant supplied to said second compartment, said filtering means being disposed above said second compartment so that coolant can flow downwardly through said filtering means into said second compartment;

first coolant transporting means for withdrawing coolant from said first compartment and supplying it to said filtering means, said first coolant transporting means including first conduit means providing communication from said first compartment to said filtering means and first pump means for causing withdrawal of coolant from said first compartment and flow thereof through said first conduit means for discharge into said filter means, said first conduit means terminating in a first discharge at said filtering means;

said filtering means including an endless conveyor member having a reach extending across the inlet to said second compartment and further including a thin sheet-like filter media overlying said reach and movable therewith for effecting filtering of the fine contaminants from the coolant while permitting the coolant to pass through the filter media, said first discharge being located directly over the filter media which is supportingly disposed on said reach;

second coolant transporting means for recycling the coolant from said second compartment back to the input side of said filtering means to effect further filtering of the fine contaminants from the coolant, said second coolant transporting means including second conduit means communicating with said second compartment and terminating in a second discharge located closely adjacent but above the filter media disposed on said reach, and second pump means for withdrawing coolant from said second compartment and transporting it through said second conduit means to said second discharge.

2. A unit according to claim 1, including a cooling unit mounted on said tank means and associated with said second conduit means for cooling the coolant as it flows therethrough, and heater means mounted on said tank means and associated with said first conduit means for heating the coolant as it flows therethrough.

3. A unit according to claim 2, including multiple-way valve means associated with said second conduit means downstream of said second pump means for permitting the coolant flowing through said second conduit means to be selectively discharged to an external location.

4. A unit according to claim 3, wherein said filter media is constructed of paper and passes exteriorly of the filtering means for disposal.

5. A unit according to claim 3, wherein said filtering means includes a roll of said filter media disposed adjacent the upstream end of said reach, the movement of said roll and said conveyor member being synchronized so that a clean section of filter media is continuously and synchronously supplied to said reach as it undergoes movement.

6. A unit according to claim 5, including agitating means associated with said first compartment for agitating the batch of contaminated coolant therein, said agitating means including elongated conduit means positioned within said first compartment and immersed within the dirty coolant, said elongated conduit means having a plurality of spaced apertures formed therethrough and means for supplying pressurized air to said conduit means for discharging a plurality of air jets through said apertures to effect agitation of the coolant within said first compartment.

7. A unit according to claim 1, including agitating means associated with said first compartment for agitating the batch of contaminated coolant therein, said agitating means including elongated conduit means positioned within said first compartment and immersed within the dirty coolant, said elongated conduit means having a plurality of spaced apertures formed therethrough and means for supplying pressurized air to said conduit means for discharging a plurality of air jets through said apertures to effect agitation of the coolant within said first compartment.

8. A unit according to claim 7, wherein said conveyor means extends in a longitudinal direction of said first compartment adjacent the bottom thereof, and said conduit means being elongated in the longitudinal direction of said first compartment.

9. A unit according to claim 8, wherein said conveyor means comprises a drag-type conveyor positioned within and movable longitudinally along said first compartment adjacent the bottom thereof, and said conduit means comprising a pair of elongated conduits disposed adjacent opposite sides of said drag conveyor and disposed at an elevation slightly thereabove, each of said conduits having a plurality of said apertures formed therethrough and spaced longitudinally therealong.

10. A unit according to claim 1, wherein said second discharge is located a substantial distance upstream from said first discharge relative to the direction of movement of said reach.

11. A method of cleaning and reclaiming coolant from a batch of contaminated coolant, comprising the steps of:
supplying a batch of contaminated coolant to a first storage compartment;
permitting the batch of contaminated coolant in said first storage compartment to remain therein so as to cause the heavy contaminants to settle to the bottom of said first compartment as sludge;
removing the sludge from the bottom of said first compartment and discharging it at an external location;
removing the partially cleaned coolant from said first compartment and supplying it to a heater wherein it is heated to a temperature of at least about 140° F.;
supplying the heated partially cleaned coolant from said heater to the input of a filtering apparatus;
depositing the partially-cleaned coolant onto a disposable sheetlike filter media as located in said filtering unit for collecting on said filter media both coarse and fine contaminants while permitting relatively clean coolant to pass downwardly through the filter media into a second storage compartment;
moving the filter media and the contaminants collected thereon to an external location for discharge;
withdrawing the relatively clean coolant from said second compartment and supplying it to a cooling unit to effect cooling of the coolant; and
supplying the coolant from said cooling unit to the input of said filtering apparatus and then discharging said coolant onto said filter media to effect further filtering of the coolant as it flows downwardly through the filter media into the second compartment.

12. A method according to claim 11, including the step of agitating the batch of contaminated coolant in said first storage compartment by injecting numerous air jets into said first compartment at a location disposed below the level of the coolant therein to agitate the coolant and accelerate the separation of the heavy contaminants.

* * * * *